M. C. JOHNSON.
Jaws for Lathe-Chucks.

No. 142,239. Patented August 26, 1873.

Witnesses
S. U. Piper
L. N. Möller

Moses C. Johnson,
by his attorney,
R. H. Eddy

UNITED STATES PATENT OFFICE.

MOSES C. JOHNSON, OF NEW BEDFORD, MASSACHUSETTS, ASSIGNOR TO MORSE TWIST DRILL AND MACHINE COMPANY, OF SAME PLACE.

IMPROVEMENT IN JAWS FOR LATHE-CHUCKS.

Specification forming part of Letters Patent No. 142,239, dated August 26, 1873; application filed February 17, 1873.

*To all whom it may concern:*

Be it known that I, MOSES C. JOHNSON, of New Bedford, of the county of Bristol and State of Massachusetts, have invented a new and useful Improvement in the Jaws of Scroll-Chucks for Lathes; and do hereby declare the same to be fully described in the following specification and represented in the accompanying drawings, of which—

Figure 1:
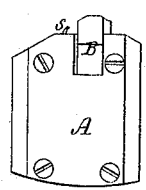
Figure 2:
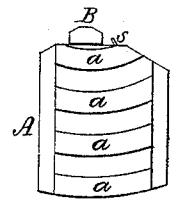
Figure 4:
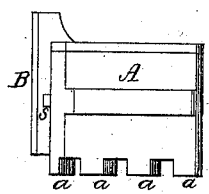
Figure 3:
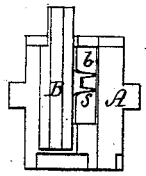
Figure 6:
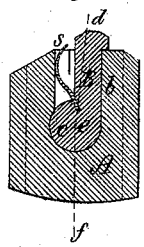
Figure 5:
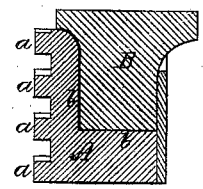

Figure 1 is a top view, Fig. 2 a bottom view, Fig. 3 a front end elevation, Fig. 4 a side elevation, and Figs. 5 and 6 longitudinal sections, of one of my improved chuck-jaws.

The movable jaw, instead of being in one piece of metal, or as usually constructed, consists mainly of two parts pivoted together, such parts, in the drawings, being marked A and B. The part or carrier A is formed to engage with the scroll of the body or case of the chuck, the projections for such purpose being shown at *a a a a*. The part A is also chambered, as shown at *b*, to receive the toggle or vibratory tooth B, the chamber being of proper shape to allow said tooth or toggle to vibrate within it a short, or the necessary, distance. The tooth or toggle B is pivoted to the part or carrier A, as shown at *c*, and there is a spring, *s*, arranged within the chamber *b* to force the toggle against or toward one side of said chamber. The tooth or toggle is to be so constructed or arranged that a plane passing through its grasping edge and its center or axis of motion shall, when the toggle is back against one side of the chamber *b*, in manner as shown in Fig. 6, make an obtuse angle with or be oblique to the direction of advance motion of the part A in the chuck. In said Fig. 6 the dotted lines *d e e f* illustrate the said angle of obliquity. The purpose of the oblique tooth or toggle B, thus combined with the part or carrier A, is to prevent the jaw from slipping upon a cylindrical object when the latter is grasped by the jaws of the chuck, for, should there be any tendency of the jaw to so slip; the rotary strain of the object on it will be such as to move the toggle on its hinge in a manner to cause the plane or the line *d e* of it to approach alignment with the line *e f*, or longitudinal plane of the carrier A. From this it will be seen that the more the toggle is moved away from that side of the chamber which is opposite to that on which the spring bears, the stronger will be the hold of the jaw on the bolt or article in the chuck.

I make no claim to "eccentric clamp-dogs" and "radial sliding blocks," or such, and a "friction-disk" and "return spring," combined and arranged as represented in the United States Patent No. 103,015, dated May 17, 1870, and granted to Loring Coes.

In my chuck-jaw the toggle-carrier A is chambered and receives the toggle and its spring within the chamber; the chamber and the toggle being formed so as to pivot the toggle to the carrier; the chamber also serving not only as a support for the spring, but as a bearing or shoulder for the toggle to bring up against, all of which differs from anything shown in such patent. Therefore,

I claim—

1. The carrier A chambered, as described, and the toggle B formed and arranged within the chamber and pivoted to the carrier, all substantially as set forth.

2. The carrier A chambered, as described, and the toggle B and the spring *s* connected and arranged within the chamber of the carrier, in manner and to operate as set forth, the toggle being pivoted to the carrier, as explained.

MOSES C. JOHNSON.

Witnesses:
GIDEON ALLEN, Jr.,
FRANK B. SIMMONS.